(No Model.) 4 Sheets—Sheet 3.
S. C. MORRIS.
SOLDERING MACHINE.
No. 358,163. Patented Feb. 22, 1887.
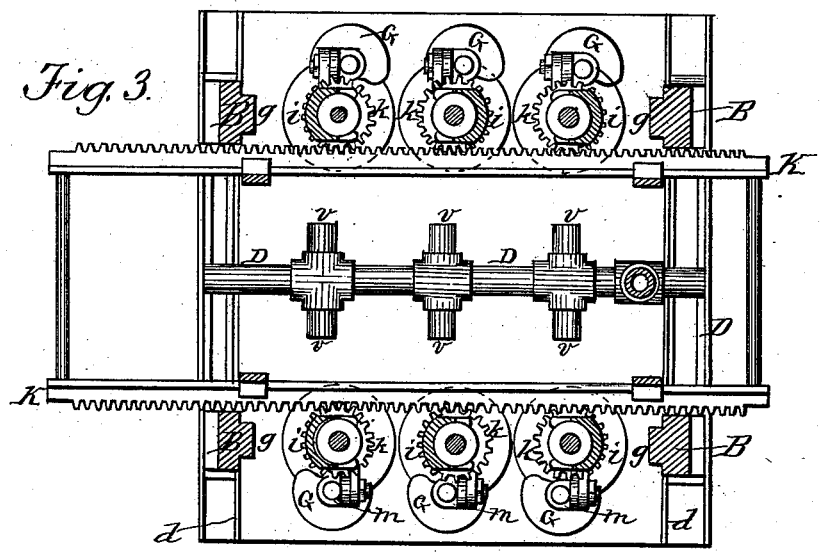
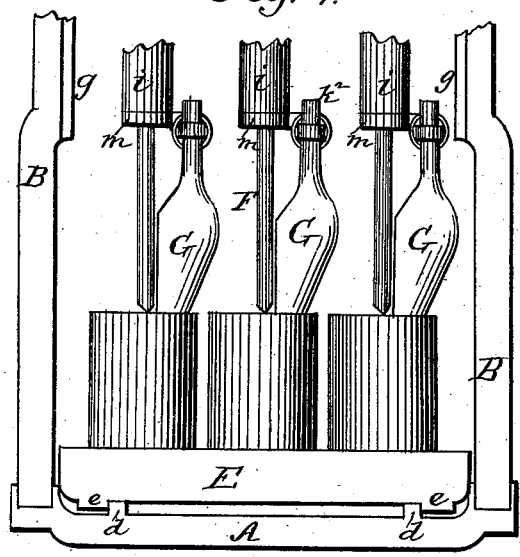
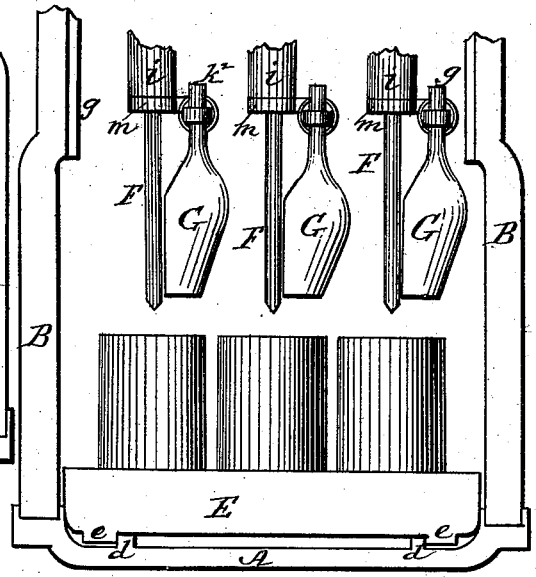
Witnesses:
Oscar Rudolph
J. W. Hamilton Johnson
Inventor:
Samuel C. Morris,
By his Attorney,
C. H. Slicer

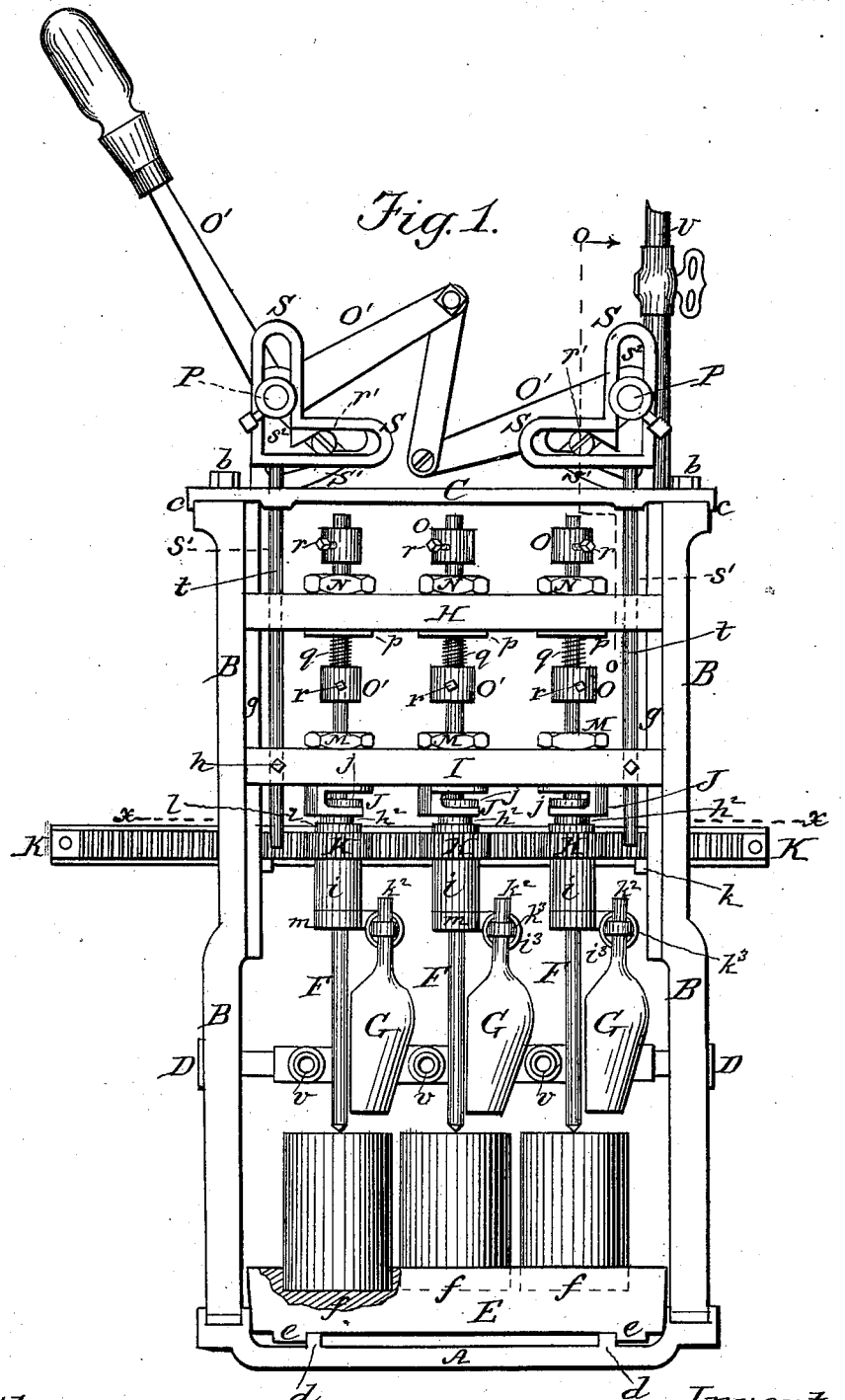

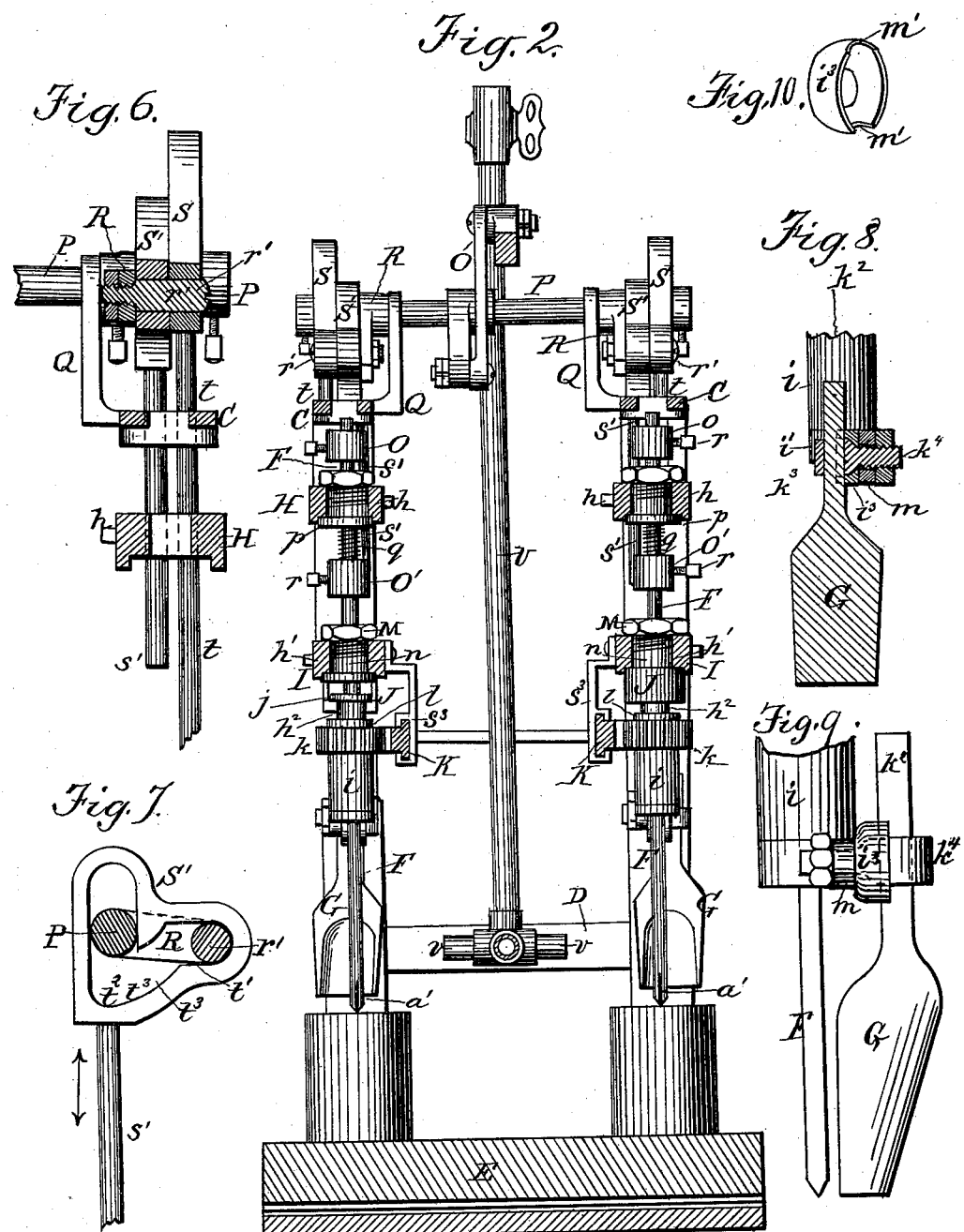

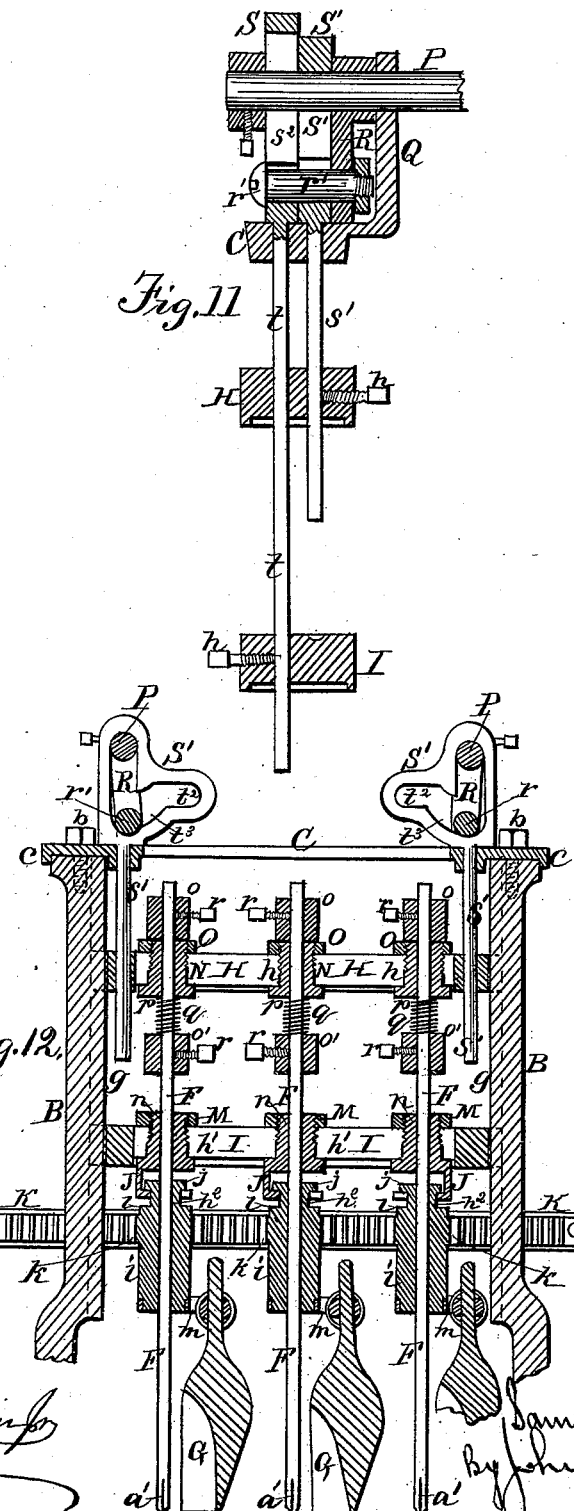

United States Patent Office.

SAMUEL C. MORRIS, OF BALTIMORE, MD., ASSIGNOR OF TWO-THIRDS TO JOHN R. MITCHELL AND CHARLES J. MORRIS, BOTH OF SAME PLACE.

SOLDERING-MACHINE.

SPECIFICATION forming part of Letters Patent No. 358,163, dated February 22, 1887.

Application filed March 22, 1886. Serial No. 196,177. (No model.)

*To all whom it may concern:*

Be it known that I, SAMUEL C. MORRIS, a citizen of the United States, residing at Baltimore city, in the State of Maryland, have invented certain new and useful Improvements in Can-Cap-Soldering Machines, of which the following is a specification, reference being had therein to the accompanying drawings.

My invention relates to devices for soldering the caps upon tin cans designed for holding canned fruit, &c., which is a well-known industry, and its methods well understood.

The object of my improvement is to enable one workman to solder on the caps of a number of cans by simultaneously operating a series of soldering-irons upon a tray of prepared cans from two sides, whereby to seal from ten to twenty or a whole tray of cans through the hereinafter-described mechanism.

Specifically, my objects are, first, to provide means for placing a tray of cans beneath a series of soldering-irons in such manner as that each iron shall be in proper relation to each can; second, to provide a means for holding the cans and irons in such relation, while at the same time preserving a means for so operating the soldering-irons as that they shall descend upon the solder after the holding means shall have first come into action, and vice versa, to lift the said irons after such operation before the holding means shall have been released; third, to provide a means for a simultaneous back-and-forth movement of the series of irons around the rims of the series of can-caps while the holding means are in action; fourth, to adjust the holding means in respect to their pressure upon the can-caps and in respect to their adaptation to cans of greater or less height; fifth, to provide a novel means for adjusting the soldering-irons both vertically and laterally, for the double purpose of permitting the iron to be lowered as its edge gradually wears out and also to allow the iron to meet the solder-rim of any diameter of can; sixth, to provide means for adjusting the soldering and holding devices in such manner as to change their distances apart when the cans are of greater or less diameter—that is to say, for different-sized cans when they are sought to be changed from close relation for small cans to a more distant relation for larger cans; seventh, to provide a suitable means for heating the soldering-irons both while lowered at work and when raised for a new set of cans, and, eighth, to provides means for sliding the tray of cans beneath the soldering and can-holding devices.

The objects of this invention having been set forth, the means referred to are hereinafter described, and illustrated in the accompanying drawings, and specifically pointed out in the claims.

In the said drawings, Figure 1 represents an elevation of my improved machine for capping cans, showing the cans on one working side as being held to receive the finish of the irons; Fig. 2, a vertical cross-section; Fig. 3, a horizontal section on the line $x\ x$ of Fig. 1; Fig. 4, a broken elevation of so much of one side of the machine as shows the holding means and capping or soldering means at work together down upon the can-top; Fig. 5, a similar broken elevation showing both holding and soldering means raised and out of action; and Fig. 6 shows a vertical cross-section taken through the top slotted lifting-cams, S S', their crank-shaft lifting pin $r'$, and the top cross-bar, H, on the line $o\ o$ of Fig. 1, the said cams being shown in their elevated positions. Fig. 7 shows the cam S' for lifting the cap-holding-rod support, the crank-shaft-lifting pin $r'$ being shown in its highest position. Figs. 8, 9, and 10 show the fastening device for the soldering iron in detail views. Fig. 11 represents a detail transverse vertical section, the plane of section passing just at one side of the cam-rod $t$ in Fig. 1, and looking toward the cam-rods $s'\ t$, showing their relative positions to each other and to the lifting-cams S S' and cross-heads H and I, which support the cap-holding rod and the soldering-iron; and Fig. 12 shows a longitudinal vertical section taken axially through one series of the cap-holding rods, showing the slots in the supporting cross-heads for said holding-rods and soldering-irons, the yokes and sleeves of the soldering-irons, and the cams for lifting the cap-holding rods.

Referring to the accompanying drawings, A is the bed of cast-iron from which four iron uprights, B, rise and are held at the top by horizontal bars C, which cross from the posts B lengthwise, and are suitably bolted to the posts or uprights by bolts $b$, and further secured by laps $c$ of the said beams hugging the uprights. These uprights B are cross-secured by bars D at the lower portion, which bars also carry the heating apparatus, to be hereinafter described. The said uprights are further cross-secured by the same means through which the machine is operated, as will be seen from the drawings and presently appear. The said bed-plate A has rails $d\ d$, crossing from one side of the machine (and that the machine has two operating sides will be seen from Fig. 3 of the drawings) to the other, over which the tray of cans E rides when inserted, the said tray having under guide strips, $e\ e$, upon its bottom to bear against said rails, whereby the said tray is slid upon the bed to bring the cans into proper relation to the holding and soldering means, and to withdraw the said tray when the soldering of the caps is finished. This tray is provided with circular depressions or sockets $f\ f$, as shown by dotted lines and broken section in Fig. 1.

The holding and soldering devices consist of the following instrumentalities:

Referring to Fig. 2, F is a rod having a vent $a'$ at its lower end, and which is arranged, as will be presently described, to bear down upon and be released from the can, and G is a solder-iron, arranged and lowered by the same power as the said rod F, as follows: Referring to Figs. 1 and 2, there are two cross-heads, H and I, passing from upright to upright and adapted to ride vertically upon guides $g\ g$ of said posts or uprights. These cross-heads lap the said guides $g\ g$, and have oblong slots $h\ h'$ each, through which passes the before-described rod F. The lower cross-head, I, has depending yokes J, which embrace the necks $h^2$ of sleeves $i$, which have caps $j$, to suspend them within said yokes. These sleeves are provided with pinions $k$, surrounding them immediately below said yokes, (separated therefrom by heads $l$,) which pinions engage with an operating-rack K, to be presently described. These sleeves $i$, which hang from the yokes J and through which the rod F passes, have each a tangential arm, $m$, which carries the soldering-iron G. There is sufficient vertical play for the head of the sleeve within its holding-yoke, so that the iron shall merely press upon the can-cap by its weight, so as to permit of its revolution, as hereinafter described. The said hangers or yokes are suspended within the slotted cross-head I by means of sleeves $n$, cast therewith and projecting upward into the said slot of said cross-head I, said sleeves being outwardly screw-threaded on a flattened surface, to be locked by nuts M upon the top of said cross-bar or cross-head I in the slot thereof, and the sleeve $n$ is of sufficient length to meet the said threaded nut M upon the top of the cross-head I. The holding vent-rod F passes through this sleeve and yoke of the hereinbefore-described operating-sleeve $i$, which latter is arranged for operation to revolve the soldering-iron G, in a manner to be presently set forth. This cross-head I thus holds the soldering-irons in suspension for revolution, and by adjusting the distance between the series in the slot of said cross-head the irons may meet the rims of cans of different sizes.

The upper slotted cross-head, H, before mentioned, carries the holding vent-rods F, and these rods pass through sleeve-connections analogous to those upon the bar or cross-head I; but the rod F is held by collars $o\ o'$, one above the cross-head H and one between the cross-heads. For centering these holding-rods F there are screw-clamp sleeves N, the vertical parts of which have a screw-threaded periphery to engage with nuts O above, and are hollowed to permit of the movement of the rod F, the said hollow screw being clamped beneath said cross-head H by their cross parts $p$. Between the upper and lower cross-heads there are spring-cushions $q$, arranged spirally around rods F between the collars $o'$ and the said cross parts $p$ of the said screws, the cross part being underneath, as before mentioned, and the said collars are adjustable vertically upon said rod F by means of thumb-screws $r$, as shown, and for a purpose hereinafter described.

Both the holding and soldering means are raised and lowered by the power of a lever, O', the connection of which with the frame of uprights and operating parts is such as to first lower the holding-rods F and next to bring down the soldering-irons into position for action, and conversely to then first raise the soldering-irons and next the holding-rods, to permit of the removal of the tray of cans for the admission of another tray, the cans cooling in the meantime. This crank-lever O' is fulcrumed in two operating-shafts, P, crossing from each upright to the other above the frame and journaled in bearings Q of said frame near their ends. The said operating-shafts have arms R, secured thereto by thumb-screws and between the said bearings Q Q and slotted cams S S', to be presently described. The said arms R, thus fastened to the shafts operated by the lever, carry wrist-pins $r'$, which move through both the slotted cams S and S', the former, S, being merely an L-frame with an open slot, $s^2$, corresponding to its shape, which permits, by means of a depending rod, $t$, thereof, passing through the top cross-bar of the frame and through the slot of the upper cross-head, H, to the lower cross-head, I, to which said rod is fastened, the said cross-head I to be raised and lowered with its soldering-irons G, which hang from said cross-head, in a manner before described. The other cam, S', has a curved slot, $t'$, inclining upward from a bed or rest-plain, as at $t^2$, (see detail, Fig. 7,) and has a depending rod, $s'$, which is fastened to the upper cross-head, H, and passes through the slotted top cross-bar of the frame, and lifts and lowers the holder or vent-rods F, which are fastened to said cross-head. Now, let the handle of the lever be at lowest position of rest, with the wrist-pins resting in the horizontal part or bed of the slot of the cam S, and also in the slot of cam S', and in such position both soldering-irons and holding-rods would be raised, as shown in Fig. 5. By raising the lever, the wrist-pin $r'$ is moved from its bed $t^2$, and as it reaches the incline $t^3$ in the slot $t'$ of cam S' it is also moving in the L-slot $s^2$ of cam S; but as the the wrist-pin's movement in cam S' causes that cam to make a longer travel than the cam S, which operates the cross-head I, it follows that while both cross-heads are descending the rods F, carried by the upper cross-head, H, will first descend and bear upon the can-caps, as shown in Fig. 1. This centers the can during the continuance of the movement of the wrist-pin in the different-shaped slots of the two cams S S' until the lower cross-head, I, is lowered, with its soldering-irons also, and this is understood by reference to Figs. 1 and 4. After the soldering operation is over and the lever lowered, the converse of this operation takes place—that is to say, the L-slotted cam S acts first, to raise the irons G. and the inclined-slot cam S' next, to raise the holding-rods F. This pause or differential movement permits the rods F to hold down the cap of the can while the solder is setting. The pinions $k$, heretofore mentioned as being upon the sleeves $i$, which latter carry the soldering-irons G, mesh with a rack, K, held in hanging guides $s^3$ on the adjacent inner faces of the uprights, which rack, being pushed back and forth when the irons and holding-rods are in the position shown in Fig. 4 upon the cans, rotates the irons which are carried by said pinioned sleeves.

Between the uprights, and mounted in cross-bars D, there is a suitable pipe, U, which has burners $v$ branching from each side to blow ignited gasoline or other heating fluid against the soldering-irons during the operation and while the soldering-irons are at rest and raised.

I have before described how the hangers or yokes which suspend the sleeves which carry the soldering-irons are held in the lower cross-head, and that the irons simply bear upon the cap-joint of their own weight, so that they may be freely revolved back and forth, as described, without applied pressure.

Having now fully described the various operations with reference to the construction of the parts performing, it remains to describe how the soldering-iron G is carried by the sleeve $i$, so as to be adapted not only for an inclination from the vertical inwardly, but for it s adaptation for use in capping different-sized cans in respect of its relation to the holding-rod.

The stem $k^2$ of the soldering iron proper, G, is passed through an eye, $k^3$, of a threaded bolt, $k^4$, which bolt passes through the tangential arm $m$ of the sleeve above described, and is held firmly in said eye by a ring washer, $i^3$, interposed between the said tangential arm $m$ and the stem $k^2$ of the iron G, the said washer being formed with locking-recesses $m'$ $m'$, (see detail, Fig. 12,) which, when the nut of the bolt is screwed home, firmly locks the stem of the iron. It will be readily seen that the bolt, with its eye and locking device, enables the iron to be turned in any direction to suit different diameters of caps and to be lowered as its point wears.

Referring to the above description as to increasing or diminishing the distance between the holding-rods and soldering-irons relatively as the machine is to be used for capping different-sized cans, that is easily accomplished by using larger ring washers, before described, or by adding rings between the arm and the eye of the bolt which carries the soldering-iron, as described. As before mentioned, the holding or vent rods are capable of vertical adjustment by means of collars, and their lateral adjustment in the slots of the top cross-bar, the upper and lower cross heads, has been set forth. The operation should be now well understood—that is, after the tray of cans is properly placed and the heaters ignited, there first descend the holding-rods, and then continuing the operation of the lever and the irons. Then the heated irons are rotated by the rack to do the soldering, and then the irons are drawn up, first by the lever, so that the cans are held until the solder sets, when the next movement of the bell-crank lever releases the hold of the rods upon the cans, and another tray of cans may be put in to receive the same treatment. Those skilled in the art of manufacturing cans for packing will readily understand how said cans are prepared for soldering. The rod $t$, connecting with the cams S, passes loosely through the cross-head H, and is fastened adjustably to the cross-head I by a thumb-screw or other clamp.

I claim—

1. In a can-capping machine, the combination of the cap-holding rods F, the soldering-irons G, and means for supporting and carrying both in independent suspended operating positions, with means for independently connecting and operating said movable supports, whereby the can-holding rods are operated in advance of the soldering-irons, substantially as described, for the purpose specified.

2. In a can-capping machine, the combination of the suspended soldering-irons, with a vertically-adjustable support, I, therefor, suspended cap-holding rods F, a vertically-adjustable support, H, therefor, slotted cams S S', independently connected with and suspending each adjustable support, and a crank-shaft-operating pin, $r'$, passing through the said slotted cams, substantially as described, for the purpose specified.

3. In a can-capping machine, the combination of a fixed frame, a series of suspended cap-holding rods, F, and a vertically-adjustable support, H, therefor, with a series of suspended soldering-irons, a vertically-adjustable support, I, therefor, and means whereby said irons are made adjustable both vertically and laterally, substantially as described, for the purpose specified.

4. The combination, in a can-capping machine, of the cap-holding rods, the soldering-irons, and their independently-adjustable suspending supports H I, with means whereby the soldering-irons and their supports are raised in advance of the cap-holding rods, and means whereby the latter are lowered in advance of the irons, substantially as described, for the purpose specified.

5. The combination, in a can-capping machine, of suspended cap-holding rods F, provided with pressure-springs $g$, with suspended soldering-irons, means whereby said irons are raised from the cap in advance of the holding-rods, and means whereby the latter are lowered upon the cap in advance of the irons, both said movements being effected by the same operating connections.

6. The combination of a fixed frame with cap-holding rods F and soldering-irons G, the suspended adjustable supports H I for said rods, and irons actuated by the same mechanical device to raise and lower said rods and irons, substantially as described, for the purpose specified.

7. The combination, in a can-cap-soldering machine, of the independent vertically-adjustable cross-heads or supports H I, the soldering-irons G, suspended by the lower support, and the cap-holding rods F, suspended by the upper of said supports, cams S S', independently connected with said supports, and a crank-shaft operating said cams to elevate the cap-holding rods in advance of the irons, substantially as herein set forth.

8. The combination of the adjustable frame supports H and I with cap-holding rods F, suspended from one of said frame-supports, soldering-irons G, their holding-sleeves $i$, suspended from the other of said supports, means for adjusting said suspending frame supports, means for rotating said irons, and means for adjusting them laterally in relation to said rods, substantially as described.

9. In a can-capping machine, the combination of the fixed frame, the slotted supports H and I, and their suspending rods $s'$ $t$ with a series of can-cap-holding rods, a series of soldering-irons, and means whereby said rods and irons are adjusted and clamped within the slots of said supports, substantially as herein set forth.

10. The combination, with the cross-head I, carrying the soldering-iron, and the cross-head H, carrying the holding-rod, of means for reciprocating said cross heads independently of each other, substantially as described.

11. The combination, with a cross-head, H, and the holding-rod carried thereby, of the cross-head I, carrying the soldering-iron, and means operating on said cross-heads to operate them independently one in advance of the other, substantially as described.

12. The combination, with the cross-head I, carrying the soldering-irons, and the cross-head H, carrying the holding-rods, of a rod passing loosely through said cross-head H and secured to the cross-head I, a rod secured to the cross-head H and passing loosely through the top cross-bar of the frame, the cams S S', operating-lever, and intermediate connections, substantially as described.

13. An organized can-cap-soldering machine embodying the following instrumentalities: a series of soldering-irons each having an operating-pinion and arranged in separate rows, separate carrying-frames for each row of irons, vertically-adjustable holding-rods arranged centrally within the soldering-irons, separate carrying-frames for each row of rods, separate double-crank shafts, separate slotted cams connected with the ends of each of the separate frames, a horizontal reciprocating rack-frame operating said soldering-irons carried by the frames which carry the soldering-irons, and a hand-lever connecting said separate double-crank shafts for simultaneous movement, in which the cap-holding rods of both rows of irons shall first act upon the can-tops to hold them, and then said irons of both rows shall be lowered and then raised slightly in advance of the holding-rods, as set forth.

14. The combination, in a can-capping machine, of a series of cap-holding rods, a vertically-adjustable support, H, therefor, the guide-sleeves N for said rods, and the adjustable collars $o$ $o'$ and springs $q$ upon said rods, with the soldering-irons, their suspending sleeves $i$, and sleeved yokes J, and the vertically-adjustable support for the latter, the said yokes and sleeves $i$ being connected to permit a limited free play to the latter at their point of suspension, substantially as described.

15. The combination, with the cross-head I, having yokes J, of the sleeve $i$, carrying a soldering-iron and having a neck provided with a cap by which said sleeve is suspended from said yoke so as to be capable of rotation, substantially as described.

16. The combination of the soldering-irons, their suspending support I, the cap-holding rods F, and their suspending support H with the rods $t$ and $s'$, the former having L-shaped open cam-frames S and connected to the support I, and the rods $s'$ having open inclined cam-frames S', oscillating crank-shafts P, having crank-pins passing through said cam-frames, intermediate lever-connections for said shafts, and an operating-lever, substantially as described, for the purpose specified.

17. In a can-capping machine, the combination of the soldering-irons, the cap-holding rods, and the vertically-adjustable supports therefor with the cam-frames S S', connected with said supports, the rock-shafts P P, having crank-pins passing through said cam-frames, means for connecting said rock-shafts for simultaneous movements, and means for operating said shafts, as set forth.

18. The combination, in a can-capping machine, of the frame B C, having the vertical standard-guides $g$ $g$, and the top bearings, Q, with the soldering-irons, the cap-holding rods and their suspending supports and cam-frames, the rock-shafts P P, having crank-pins operating said cam-frames, and intermediate connections for said shafts, all constructed and arranged to effect the vertical adjustment of one of said cross-heads in advance of the other, substantially as set forth.

19. In a machine for the purpose described, the combination, with a reciprocating cross-head provided with a depending yoke, J, of a holding-rod passing loosely through said yoke, the yoke carrying a sleeve to which is attached a soldering-iron, and which sleeve shall have a little vertical play in said yoke, whereby said iron will press on the can-top merely by its weight, as set forth.

20. The combination, with the slotted cross-head I, of the yoke J, having cast integral therewith the threaded sleeve $n$, passing through the slot in said cross-head, and the nut M, engaging the thread of said sleeve above the cross-head, substantially as described.

21. The combination, with the slotted cross-head H, of the holding-rod F, the sleeve having threaded shank passed through the slot in said cross-head, the nut engaging the thread of said sleeve above the cross-head, the cross part $p$, adjustable collar $o'$, and spring-cushion $q$, all arranged and operating substantially as and for the purpose specified.

In testimony whereof I have affixed my signature in presence of two witnesses.

SAMUEL C. MORRIS.

Witnesses:
JOHN R. MITCHELL,
CHAS. J. MORRIS.